Feb. 12, 1935.  P. SPENCE  1,991,032

VALVE

Original Filed May 29, 1929

INVENTOR
Paulsen Spence
BY
Mitchell & Bechert
ATTORNEY

Patented Feb. 12, 1935

1,991,032

UNITED STATES PATENT OFFICE 1,991,032

VALVE

Paulsen Spence, East Orange, N. J.

Original application May 29, 1929, Serial No. 366,837. Divided and this application May 23, 1931, Serial No. 539,481

1 Claim. (Cl. 251—81)

My invention relates to a double seated spool valve. This application is a division of my copending application Serial No. 366,837, filed May 29, 1929.

In a double seated valve it is of course necessary that the valve seats be accurately spaced apart the same distance that the valve heads are spaced apart. The machining operations necessary to accomplish this result are facilitated by having both of the valve seats on a single removable seat member which can be machined while separate from the valve body. When both of the valve seats are formed on a single removable valve seat member which is thereafter mounted in one of the chambers of a valve which is to be used with a high temperature fluid, the valve seat member and the partition of the valve in which it is mounted will undergo unequal expansion and contraction when the valve is opened or closed. This is because when the valve is closed but one side of the partition will be exposed to the high temperature fluid, with the result that after the valve is closed the mean temperature of the valve seat member is greater than the mean temperature of the partition if the valve seat member is mounted in the inlet chamber, and is less than that of the partition if the valve seat member is mounted in the outlet chamber. Upon opening or closing the valve the valve seat member will therefore expand or contract less than the partition if the valve seat member is in the inlet chamber, and will expand or contract more than the partition if the valve seat member is in the outlet chamber. This unequal expansion is liable to cause leakage and breakage of parts.

It is an object of my invention to provide a double seated spool valve having a removable unitary double seated valve seat member in which provision is made for unequal expansion of the seat member and of the partition in which it is mounted.

This object is accomplished by threading or otherwise securing one end of the seat member in one opening of the partition and permitting the other end of the seat member to expand into another opening in the partition.

It is another object of my invention to provide a double seated spool valve having spaced apart valve heads, each of which is provided with guides which coact with bores in the valve seat member for guiding the motion of the heads.

Other objects and features of the invention will be pointed out or will become apparent upon a reading of the specification.

In the drawing which shows, for illustrative purposes only, a preferred form of the invention—

Figure 1:
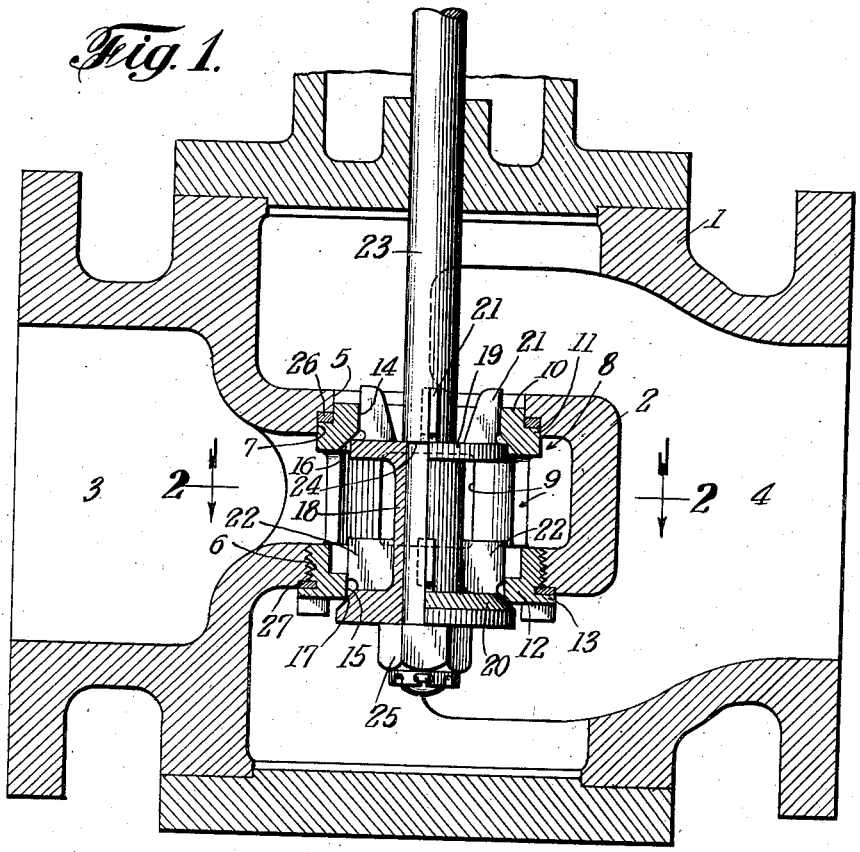
Fig. 1 is a sectional view of a double seated spool valve illustrating features of the invention, parts being shown in elevation.
Figure 2:
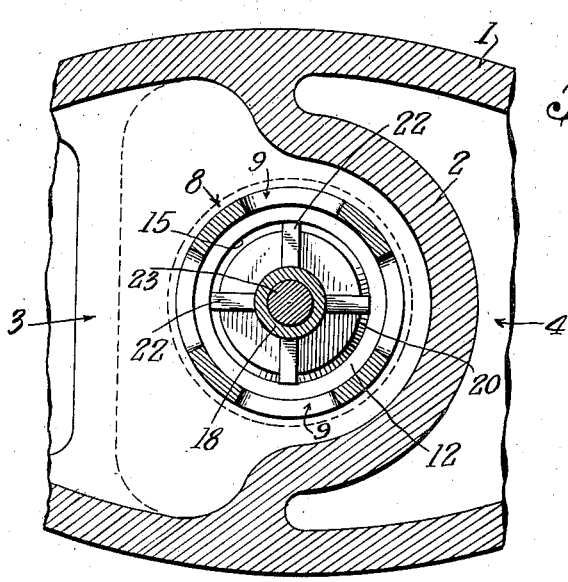
Fig. 2 is a section taken on the line 2—2 of Fig. 1.

In said illustrative drawing, 1 represents a valve body having a partition 2 therein which divides the valve body into two chambers 3 and 4. This partition has two bores 5 and 6 therethrough whereby communication is established between the two chambers of the valve. The bore 5 may be counterbored as shown at 7, and the bore 6 is threaded. 8 is a valve seat member in the form of a hollow cylinder having one or more radial openings 9 in the side wall thereof. The end 10 of the member 8 is a snug fit in the bore 5 and may have a shoulder 11 which fits in the counterbored portion of the partition 2. The other end 12 of the member 8 may have a flange 13 thereon at its outer end, and is threaded externally inside of the flange to engage the thread in the bore 6. The ends 10 and 12 of the valve seat member 8 have bores 14 and 15 therein which may be of different diameters. As shown on the drawing, the partition 2 is so shaped and the valve seat member 8 is so mounted therein as to permit the flow of high temperature fluid completely around said valve seat member between the same and the partition. Spaced apart valve seats 16—17 are formed on the member 8. 18 is a sleeve or spool which carries the spaced apart valve heads 19—20 which may be formed integral therewith. 21—21, 22—22, are guides which may be integral with the valve heads 19 and 20 respectively and which slidably fit in the bores 14 and 15 in the member 8. The sleeve 18 is mounted on a valve stem 23 and may be held in place against a shoulder 24 on the valve stem by means of a nut 25 which is threaded on the end of the valve stem. 26 is a gasket or resilient packing which may be interposed between the shoulder 11 on the member 8 and the bottom of the counterbore 7. 27 is a gasket or resilient packing which may be interposed between the flange 13 of the member 8 and the partition 2.

It will be seen that I have provided a double seated spool valve which has a removable unitary double seated valve seat member, thereby facilitating the accurate machining of the valve seats. I have also made provision so that when the valve is used with a high temperature fluid the unequal expansion of the valve seat member and the partition in which it is mounted will be provided for. As will be seen from the foregoing description, the longitudinal expansion and contraction of the valve seat member 8 is provided for by allowing the member 8 to expand into the bore 5 and the counterbore 7 of the partition 2. The joint between the floating end of the member 8 and the partition 2 is kept tight by means of the gasket or resilient packing 26 which is compressed in place when the member 8 is screwed into its seat in the partition 2.

While the invention has been described in considerable detail and a specific form has been shown in the drawing, it is to be understood that the invention may be otherwise embodied and employed in connection with double seated spool valves and the like, of various types other than that herein shown.

I claim:

In a double seated spool valve for high temperature fluids, a partition having therein two spaced apart bores of different size, the larger bore being threaded and the other bore being counterbored at the side facing the threaded bore, a unitary valve seat member having thereon spaced apart valve seats, one end of said valve seat member being threaded to engage with said threaded bore and the other end being shouldered to fit within said other bore and counterbore and movable therein, said partition being spaced from the sides of the valve seat member to provide a fluid passage around the same, a spool member slidable within said valve seat member and having spaced valve heads thereon to cooperate with said seats, said valve seat member and said spool member being exposed to the high temperature fluid in substantially the same way so as to expand and contract together and retain a fixed relationship between the valve heads and the valve seats, and a resilient packing between the bottom of the counterbore and the shouldered portion of said valve seat member, whereby expansion of the valve seat member greater than the expansion of the partition will compress said packing.

PAULSEN SPENCE.